US012015365B2

(12) United States Patent
Opie et al.

(10) Patent No.: US 12,015,365 B2
(45) Date of Patent: Jun. 18, 2024

(54) FAULT TOLERANT ACTUATOR ASSEMBLY

(71) Applicant: Moog Inc., East Aurora, NY (US)

(72) Inventors: Ray Opie, Orchard Park, NY (US); Denis O'Sullivan, County Cork (IE); Michael J. Willers, County Cork (IE)

(73) Assignee: Moog Inc., East Aurora, NY (US)

( * ) Notice: Subject to any disclaimer, the term of this patent is extended or adjusted under 35 U.S.C. 154(b) by 303 days.

(21) Appl. No.: 17/637,909

(22) PCT Filed: Aug. 25, 2020

(86) PCT No.: PCT/US2020/047851
§ 371 (c)(1),
(2) Date: Feb. 24, 2022

(87) PCT Pub. No.: WO2021/041446
PCT Pub. Date: Mar. 4, 2021

(65) Prior Publication Data
US 2022/0286077 A1    Sep. 8, 2022

Related U.S. Application Data

(60) Provisional application No. 62/891,502, filed on Aug. 26, 2019.

(51) Int. Cl.
H02P 29/028    (2016.01)
H02K 5/04    (2006.01)
(Continued)

(52) U.S. Cl.
CPC ............. *H02P 29/028* (2013.01); *H02K 5/04* (2013.01); *H02K 11/225* (2016.01); *H02K 11/26* (2016.01); *H02K 11/33* (2016.01); *H02P 25/022* (2013.01)

(58) Field of Classification Search
CPC ...... H02P 29/028; H02P 25/022; H02P 25/22; H02K 5/04; H02K 11/225; H02K 11/26; H02K 11/33
(Continued)

(56) References Cited

U.S. PATENT DOCUMENTS 4,896,089 A    1/1990    Kliman et al.
5,517,102 A    5/1996    Jensen
(Continued)

FOREIGN PATENT DOCUMENTS

CN    104767462 A    7/2015
CN    104767463 A    7/2015
(Continued)

OTHER PUBLICATIONS

Babetto et al. (Jan. 2018) "Synchronous Reluctance Motor with Dual Three-Phase Winding for Fault-Tolerant Applications," IEEE: 2297-2303.
(Continued)

Primary Examiner — David Luo
(74) Attorney, Agent, or Firm — Harter Secrest & Emery LLP

(57) ABSTRACT

An electric motor assembly comprising a housing containing a secondary power source, a motor driver, an electric motor, power sensors to sense faults in a primary power supply and the secondary power source, primary and secondary winding sensors configured to sense faults in a primary winding and a secondary winding of the electric motor, the motor driver comprising a primary controller to control the primary winding in a normal operation mode and a secondary motor controller operatively configured to control at least one of the primary winding and/or the secondary winding in a secondary operation mode, the secondary motor controller configured to drive the motor to a safe position using the
(Continued)

secondary winding in the event of a sensed fault in the primary winding and to drive the motor to the safe position using the secondary power source in the event of a sensed fault in the primary power source.

14 Claims, 8 Drawing Sheets

(51) Int. Cl.
*H02K 11/225* (2016.01)
*H02K 11/26* (2016.01)
*H02K 11/33* (2016.01)
*H02P 25/022* (2016.01)

(58) Field of Classification Search
USPC .................................................. 318/34, 255
See application file for complete search history.

(56) References Cited

U.S. PATENT DOCUMENTS

| | | | |
|---|---|---|---|
| 6,320,731 B1 | 11/2001 | Eaves et al. | |
| 6,693,403 B2 | 2/2004 | Chen | |
| 6,949,908 B2 * | 9/2005 | Maslov | H02P 6/28 |
| | | | 318/434 |
| 8,084,972 B2 | 12/2011 | Strong et al. | |
| 8,283,881 B2 | 10/2012 | Gallegos-Lopez | |
| 8,544,580 B2 | 10/2013 | Cheng et al. | |
| 8,659,254 B2 | 2/2014 | Ueno | |
| 8,823,332 B2 | 9/2014 | Smout | |
| 8,890,380 B2 | 11/2014 | Andrieux et al. | |
| 8,994,308 B2 | 3/2015 | Aghili | |
| 9,203,290 B2 | 12/2015 | Roesmann | |
| 9,276,447 B2 | 3/2016 | Mei | |
| 9,614,465 B2 | 4/2017 | Shriver et al. | |
| 9,698,642 B1 | 7/2017 | Goessling et al. | |
| 9,705,441 B2 | 7/2017 | Flynn et al. | |
| 9,705,442 B2 | 7/2017 | Mohammadour et al. | |
| 9,712,099 B2 | 7/2017 | Flynn et al. | |
| 9,897,072 B2 | 2/2018 | Vetter et al. | |
| 9,906,058 B2 | 2/2018 | Theopold et al. | |
| 10,162,009 B2 | 12/2018 | Schmaus et al. | |
| 2011/0018482 A1 | 1/2011 | Purcell et al. | |

FOREIGN PATENT DOCUMENTS

| | | |
|---|---|---|
| EP | 2617998 A2 | 7/2013 |
| EP | 2738067 A1 | 6/2014 |
| JP | 2018050441 A | 3/2018 |
| WO | 2017150638 A1 | 9/2017 |
| WO | 2017150639 A1 | 9/2017 |

OTHER PUBLICATIONS

Bolognani (2000) "Experimental Fault-Tolerant Control of a PMSM Drive," IEEE Transactions on Industrial Electronics 47(5): 1134-1141.
Bolvashenko et al. (2016) "Comparative Study of Reliability and Fault Tolerance of Multi-Phase Permanent Magnet Synchronous Motors for Safety-Critical Drive Trains," Renewable Energy & Power Quality Journal 14: 133-138.
Duran et al. (Jan. 2018) "A Simple, Fast, and Robust Open-Phase Fault Detection Technique for Six-Phase Induction Motor Drives," IEEE Transactions on Power Electronics 33(1): 547-557.
European Patent Office (ISA/EP), International Search Report and Written Opinion in PCT/US2020/047851, dated Nov. 20, 2020, 9 pages.
Guzman et al. (2015) "Open-Phase Fault Operation on Multiphase Induction Motor Drives," Chapter 12 in Induction Motors—Application, Control and Fault Diagnostics: 327-356.
NXP Semiconductors (Aug. 2018) "3-Phase PMSM Development Kit with MPC5744P," Document No. AN12017: 1-39.
Rubino et al. (Sep./Oct. 2018) "Model Predictive Direct Flux Vector Control of Multi-three-Phase Induction Motor Drives," IEEE Transactions on Industry Applications 54(5): 4394-4404.
Ting et al. (2017) "Fault-Tolerant Method for Six-Phase PMSM by Adjusting Phase Angle," IEEE: 5 pages.
Zhou et al. (Nov. 2018) "Predictive DTC Strategy With Fault-Tolerant Function for Six-Phase and Three-Phase PMSM Series-Connected Drive System," IEEE Transactions on Industrial Electronics 65(1): 9101-9112.

* cited by examiner

FAULT TOLERANT ACTUATOR ASSEMBLY

TECHNICAL FIELD

The present disclosure relates generally to the field of subsea drilling, processing and production equipment, and more particularly to an improved fault tolerant actuation system for use in subsea environments or in other inhospitable or constrained environments, such as gas turbine power generation environments.

BACKGROUND ART

In subsea oil and gas exploration, the drilling system or wellhead may be located many thousands of feet below the sea surface. Specialized equipment is therefore used to drill, produce and process oil and gas on the sea floor, such as subsea trees, processing systems, separators, high integrity pipeline protection systems, drills, manifolds, tie-in systems and production and distribution systems. Such equipment is commonly controlled by a number of types of valves. Also, a common approach for moving production fluids to the surface includes the use of a submersible pump. These pumps are installed in the well itself, typically at the lower end of the production tubing. One type of such a submersible pump generally comprises a cylindrical housing and an inner reciprocating piston, which reside at the base of the production line. The piston is reciprocated axially within the well bore by a linear magnetic motor. The linear electric motor thus enables the piston of the pump to reciprocate vertically, thereby enabling fluids to be lifted with each stroke of the piston towards the surface of the well.

Combustion turbines generally take in air and compress the air in a compression turbine stage. Gas or oil fuel is metered into a combustion chamber and the resulting hot exhaust gas then passes over the turbine blades creating torque on a shaft. The shaft is connected to a generator that then produces electricity. The metering of the fuel in the combustion chamber can be critical because it controls the speed of the turbine as the load varies. The metering of the flow of gas or oil into the combustion chamber is typically performed with a fuel control valve. A typical fuel control valve for a gas turbine utilizes a stationary metering seat and an adjustable metering plug to meter the fuel through the valve. The metering plug is connected by a valve stem to an actuator which modulates the position of the metering plug and therefore the flow of fuel through the valve.

BRIEF SUMMARY

With parenthetical reference to corresponding parts, portions or surfaces of the disclosed embodiments, merely for the purposes of illustration and not by way of limitation, an electric motor assembly (15) is provided comprising: a housing (16) having an interior volume (18); the housing containing in the interior volume an electric motor (19, 119), a motor driver (22, 122), and a secondary power source (23, 123A, 123B); the electric motor comprising a stator (20) and a mover (21) mounted for movement relative to one another; the electric motor operatively configured to connect to a primary power supply (42, 142); the mover of the electric motor operatively configured to mechanically couple to an object (40, 140, 240) external to the interior volume of the housing to be driven by the electric motor within a range of motion (45, 145) and having a safe position (46, 146) within the range of motion; the electric motor connected to the secondary power source; the stator comprising a primary winding (24A, 24B, 24C) operatively configured to move the mover in a normal operation mode (60); the stator comprising a secondary winding (25A, 25B, 25C) operatively configured to move the mover in a secondary operation mode (80, 100); the motor driver comprising a primary motor controller (26, 126) operatively configured to control the primary winding in the normal operation mode; the motor driver comprising a secondary motor controller (28, 128) operatively configured to control at least one of the primary winding and/or the secondary winding in the secondary operation mode; a power sensor (30) configured to sense a fault in the primary power supply and communicating with the secondary motor controller; a power sensor (31) configured to sense a fault in the secondary power source and communicating with the secondary motor controller; a primary winding sensor (33A, 33B, 33C) configured to sense a fault in the primary winding and communicating with the secondary motor controller; a secondary winding sensor (34A, 34B, 34C) configured to sense a fault in the secondary winding and communicating with the secondary motor controller; the secondary motor controller configured to drive the motor to the safe position using the secondary winding in the event of a sensed fault in the primary winding; and the secondary motor controller configured to drive the motor to the safe position using the secondary power source in the event of a sensed fault in the primary power source.

The electric motor assembly may comprise a primary motor controller sensor (32) configured to sense a fault in the primary motor controller and communicating with the secondary motor controller, and the secondary motor controller may be configured to drive the motor to the safe position in the event of a sensed fault in the primary motor controller. The secondary motor controller may be configured to drive the motor to the safe position in the event of a sensed fault in the secondary power source. The motor may comprise a three-phase interior or surface mount permanent magnet synchronous motor. The mover may comprise a permanent magnet and the primary winding may comprise three phases. The secondary winding may comprise a single phase. The secondary winding may comprise three phases. The electric motor assembly may comprise a mover position sensor (35A, 35B) configured to sense a fault in the electric motor and communicating with the secondary motor controller, and the secondary motor controller may be configured to drive the motor to the safe position in the event of a sensed fault in the electric motor. The secondary motor controller may be configured to operate a common DC bus (48, 148) such that energy from the primary power supply is used to charge the secondary power source when the secondary power source is not fully charged. The secondary power source may comprise a capacitor or a battery. The object may comprise a valve (140B) or a pump (241A) in a subsea environment. The mover position sensor may comprise an encoder, a resolver or a LVDT. The power sensor may comprise a voltage sensor. The primary power supply may comprise a three phase AC power supply.

DETAILED DESCRIPTION OF THE EMBODIMENTS

Figure 1:
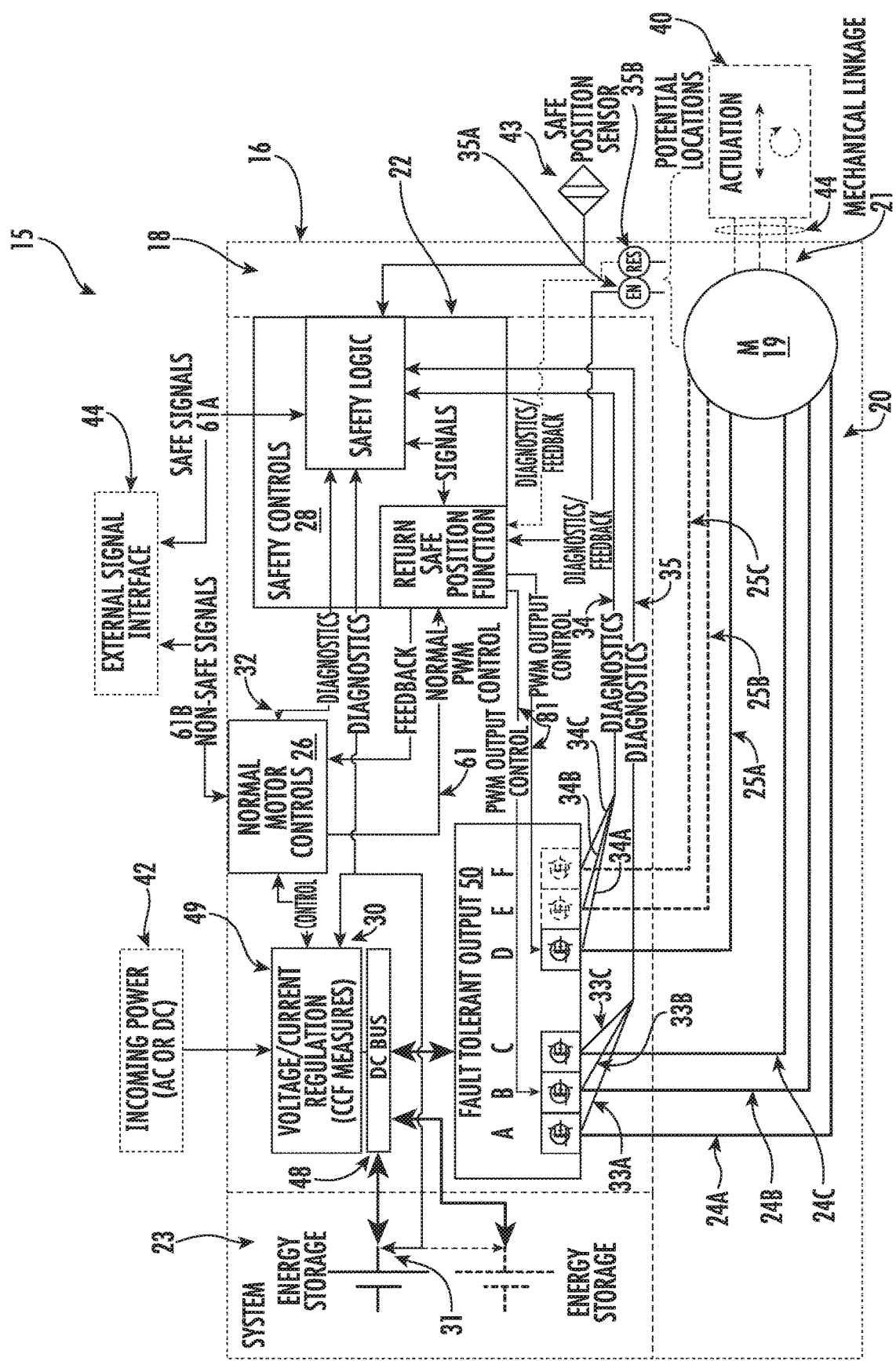
FIG. 1 is a schematic diagram of a first embodiment of the electric motor assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, the present disclosure broadly provides a fault tolerant actuation system, of which an embodiment is indicated at 15. Motor assembly 15 is adapted to actuate a process valve or other type of valve or similar component in a subsea, subterranean or other harsh environment. However, motor assembly may be used in other alternative applications. As shown, motor system 15 generally includes outer housing 16 having interior volume 18 generally containing local energy storage 23, motor driver 22 and motor 19. Motor assembly 15 receives incoming power from primary power supply 42, external safety signals from external signal interface 44, and driven object position from safe position sensor 43. Motor assembly 15 drives mover 21 to actuate driven object 40 via mechanical linkage 41 connected to mover 21 of motor 19.

Housing 16 generally supports stator 20 and moving element 21 and provides interior volume 18, which is sealed from the outside to protect the components contained therein. While in this embodiment stator 20 is generally held stationary and element 21 is generally permitted to rotate about its longitudinal axis, alternatively element 21 may be configured to be held stationary while element 20 is generally permitted to rotate about its longitudinal axis.

Power supply 42 provides electrical power to motor system 15. In this embodiment, power supply 42 is AC. However, a DC power supply may be used as an alternative. Power supply 42 is connected to conventional AC to DC converter 49, which includes conventional common cause failure (CCF) measures and voltage and current protections. A boost style DC/DC converter to step up the voltage to the desired system bus voltage, with current limiting and diagnostic signals to controller 28, may be included. Output fuses to ensure that a failure of the converter or one energy storage device does not cause sympathetic failure of another energy storage device may also be included. Converter 49 is connected to common DC bus 48, which is connected to both local energy storage 23 and drive electronics output 50.

As shown in FIG. 1, energy storage 23 is connected to power supply 42 via common DC power bus 48. While power supply 42 is functioning properly, energy storage 23 is charged to the desired voltage or capacity. In the event of a power supply failure, energy storage 23 will temporarily maintain the voltage on common DC power bus 48 while energy is drawn by controller 28 and drive output stage 50. In this embodiment, energy storage 23 comprises ultracapacitors in series to operate the system bus voltage and store enough energy to deploy the subject actuator without external power. Backup storage 23 connects to driver motor output 50 through common DC bus 48. Alternatively, a battery or other capacitor bank may be used as backup energy storage. The energy storage may be any device or system for storing energy, examples of which include a capacitor, an ultracapacitor, a battery, an inductor, a flywheel, or other similar devices.

Driver motor output power stage 50 controls flow of power to, from and between the terminals of electric motor 19. Power stage 50 converts DC power into a controlled Pulse Width Modulated (PWM) current which drives motor 19. The operation of driver motor output 50 is governed by PWM control signals from motor controller 26 and safety controller 28.

In this embodiment, motor 19 is a brushless DC variable-speed permanent magnet synchronous servo-motor that is supplied with a current and includes resolver feedback to monitor rotor angle which is used for closed loop motion control in controller 26 and 28. Brushless DC motor 19 is a synchronous electric motor with an electronically controlled commutation system. Motor 19 has inner rotor 19 with permanent magnets and fixed non-rotating stator 20 with primary coil windings 24A, 24B, 24C and secondary coil windings 25A, 25B, 25C. Rotor 21 includes external magnets facing stator 20. Rotor 21 is configured to selectively rotate about its axis of rotation relative to stator 20 and housing 16. Stator 20 does not rotate relative to housing 16. When current is appropriately applied through coils 24A, 24B, 24C, 25A, 25B, 25C of stator 20, a magnetic field is induced. The magnetic field interaction between stator 20 and rotor 21 generates torque which may rotate rotor 21, which is connected to mechanical linkage 41 so as to rotationally or linearly drive movable object 40.

In order to control motor 19 in normal operation, electronic controller 26, via controller 28, distributes power to stator windings 24A, 24B, 24C, 25A, 25B, 25C such that a rotating magnet field is produced by the stator windings. Motor 19 includes rotary encoder 35A and resolver 35B for determining the angular position of rotor 21. With the feedback information provided by encoder 35A and/or resolver 35B, the position of rotor 21 is known and by this the position of the permanent magnets of rotor 21. With this knowledge motor controller 26 can generate the rotating magnetic field so that electric motor 19 rotates at the desired speed and torque. Drive electronics 50, based on encoder 35A and/or resolver 35B angular position feedback received by controllers 26 and 28, generate and commutate the stator fields to vary the speed and direction of motor 19. Accordingly, motor 19 will selectively apply a torque on rotor 21 in one direction about axis x-x at varying speeds and will apply a torque on rotor 21 in the opposite direction about axis x-x at varying speeds.

Alternatively, motor 19 may be a three-phase permanent linear magnet DC electric motor having stationary stator 20 and a sliding linear shaft. Is this embodiment, the linear magnetic motor includes a stator and a shaft that is driven to move linearly (that is, as a straight line translation) with respect to the stator. The shaft is at least partially surrounded by the stator and is held in place relative to the stator by a bearing. The shaft generates a magnetic field by virtue of having a series of built in permanent magnets. The stator again generates magnetic fields through annular magnetic coils. By timing the flow of current in the coils with respect to the position and/or momentum of the shaft, the interaction of magnetic forces from the shaft and from the stator will actuate the shaft to move linearly in either direction. Other motors may also be used as alternatives.

In addition, motor 19 may be operated without the information from a position sensor (i.e. without the feedback of encoder 35A and/or resolver 35B) in a sensorless control mode. Sensorless control mode can be based on the detection of the back electro magnetic force (BEMF) induced by the movement of permanent magnet rotor 21 in front of the stator winding of stator 20. The sensorless control mode analyzes for example zero crossing of BEMF in order to synchronize phase commutations. For lower speeds, where BEMF is small in amplitude, the magnetic asymmetry of the motor may be used instead. For example, with interior permanent magnet synchronous motors (IPMSM), which are a subcategory of brushless motors, a current sensor may be used to measure a so-called injection current signal. From the injection current signal for example a Kalmanfilter is used to estimate the position of the rotor.

Electric motor 19 is mechanically coupled to driven object 40 through linkage 41. Linkage 41 may contain gears, a ballscrew or other similar devices. A gear train may be used to provide a mechanical advantage to the torque produced by motor 19 or no gears may be used as alternatives. In the embodiment shown in FIG. 9, linkage 141 comprises a ballscrew for converting rotary motion into linear motion to provide the stroke shown in FIG. 5.

Figure 4:
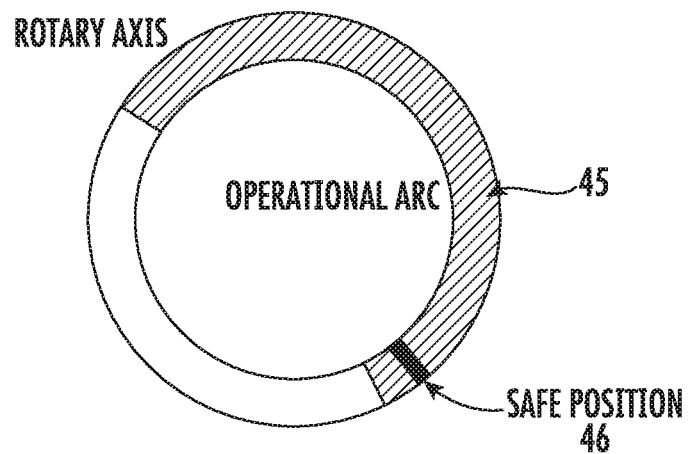
FIG. 4 is an enlarged schematic diagram of a first embodiment of the actuated object shown in FIG. 1.

In the embodiment shown in FIG. 4, object 40 has rotational range of possible motion 45. Also, within rotational range of motion 45 of object 40 is substantially neutral or safe range or position 46. When object 40 is at rest in safe range 46, object 40 is in a position in which an associated hazard does not exist or object 40 is not as inclined to move, as defined by the application. For example, object 40 may be a valve and position 46 may be a position in which the valve is fully closed.

Figure 5:
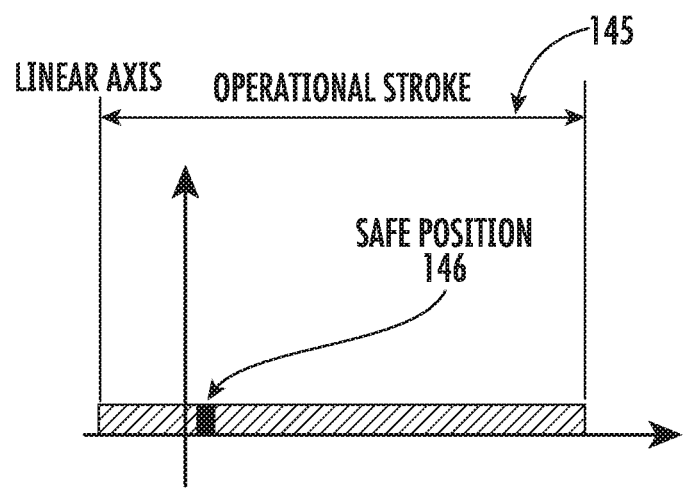
FIG. 5 is an enlarged schematic diagram of a second embodiment of the actuated object shown in FIG. 1.

In the embodiment shown in FIG. 5, object 40 has linear range of possible motion or operational stroke 145. Also, within rotational range of motion 145 of object 40 is substantially neutral or safe range or position 146. When object 40 is at rest in safe range 146, object 40 is in a position in which an associated hazard does not exist or object 40 is not as inclined to move, as defined by the application. For example, object 40 may be a valve and position 146 may be a position in which the valve is fully closed.

Position sensor 43 measures the position of object 40 within range of motion 45 or 145 and relative to safe position 46 or 146. Thus, position sensor 43 can determine when object 40 is within safe position 46 or 146 of range of motion 45 or 145. In the embodiment shown in FIG. 5, position sensor 43 is a Linear Variable Differential Transformer ("LVDT"). However, an encoder, resolver or other similar device may be used as alternatives. A position sensor may be any electrical device for measuring the position, or a derivative of position, or distance from an object, examples of which include an encoder, a resolver, a linear variable differential transformer, a variable resistor, a variable capacitor, a laser rangefinder, an ultrasonic range detector, an infrared range detector, or other similar devices.

Motor 19 includes encoder 35A and resolver 35B, with readings compared to determine a fault. Controller 28 continuously calculates and compares the resolver position with the encoder position. In case of a detected encoder failure, controller 28 can use the continuously calculated position to switch seamlessly from encoder mode into self-sensing mode.

The voltage of primary power supply 42 is measured by power sensor 30, and the output from power sensor 30 is read by safety controller 28. A power sensor may be any electrical or mechanical device for measuring the power of an electrical system, examples of which include a voltage sensor, a current sensor, a device having both voltage and current sensors, or other similar devices. The voltage of power storage 23 is measured by power sensor 31 to measure the capacity of back-up power supply 23, and the output from power sensor 31 is read by safety controller 28. The position of object 40 is measured by position sensor 43, and the output from position sensor 43 is read by controller 28. A failure of coil windings 24A of motor 19 is measured by winding sensor 33A, and the output from sensor 33A is read by controller 28. A failure of coil windings 24B of motor 19 is measured by winding sensor 33B, and the output from sensor 33B is read by controller 28. A failure of coil windings 24C of motor 19 is measured by winding sensor 33C, and the output from sensor 33C is read by controller 28. A failure of coil windings 25A of motor 19 is measured by winding sensor 34A, and the output from sensor 34A is read by controller 28. A failure of coil windings 25B of motor 19 is measured by winding sensor 34B, and the output from sensor 34B is read by controller 28. A failure of coil windings 25C of motor 19 is measured by winding sensor 34C, and the output from sensor 33C is read by controller 28.

System 15 thereby includes diagnostic feedback to safety controller 28. Controller 28 monitors encoder 35A data integrity, continuously monitors the states of the sensor devices, monitors power supplies 42 and 23, monitors normal motor controller 26 functionality via sensor 32, and sets a fault if the subject parameters fall outside of acceptable levels.

Motor drive 28 includes drive power output electronics 50 to commutate motor 19 and receives feedback from sensors in the system and controls motor 19 accordingly. Controller 28 includes data sampling and storage mechanisms for receiving and storing sensory data and data storage for storing operational parameters as well as sensory data logs. For example, memory stores the values for several operating variables, including safe position 45, the primary power source 42 threshold, and the battery 23 threshold. Controller 28 is configured to perform a variety of computer-implemented functions such as performing method steps, calculations and the like and storing relevant data as disclosed herein. For communicating with various sensors, a sensor interface permits signals transmitted from the sensors to be converted into signals that can be understood and processed by processor 28. The sensors may be coupled to the sensor interface via a wired connection. In other embodiments, they may be coupled to the sensor interface via a wireless connection. In this embodiment, controller 28 is a field programmable gate array ("FPGA"). However, a programmable logic device ("PLD"), microprocessor, microcontroller or other similar device may be used as alternatives. A controller may be any digital device which has output lines that are a logic function of its input lines, examples of which include a microprocessor, microcontroller, field programmable gate array, programmable logic device, application specific integrated circuit, or other similar devices. Controller 28 has inputs to receive the respective output signals from power sensor 30, power sensor 31, controller sensor 32, winding sensors 33A, 33B, 33C, 34A, 34B, and 34C, motor sensors 35A and 35B, and position sensor 43. Controller 28 also controls the PWM control lines connected to drive power network 50. Also connected to controller 28 is external signal interface 44. Controller 28 is programmed to operate as described below and in FIGS. 6 and 7.

A conventional servo drive may include a drive output stage having three motor phase windings connected to the motor. Conventionally, when one of the three motor phase windings fails (e.g., is shorted) the motor will not operate. In this embodiment, motor 19 is provided with the ability to run to safe position ("RSP") when a motor phase winding failure, a power failure and/or a motor sensor failure is detected. Safe position 46 is the position where an associated hazard does not exist, and it is determined by the application in which the motor is utilized. A conventional solution to this problem is to utilize a duplicate (i.e., secondary) servo drive with contactors switching the motor windings. However, this conventional solution does not address motor fault tolerance. The present design utilizes a single servo drive that can detect a motor phase winding failure and continue to drive the remaining motor phase windings to operate the motor to RSP.

Figure 2:
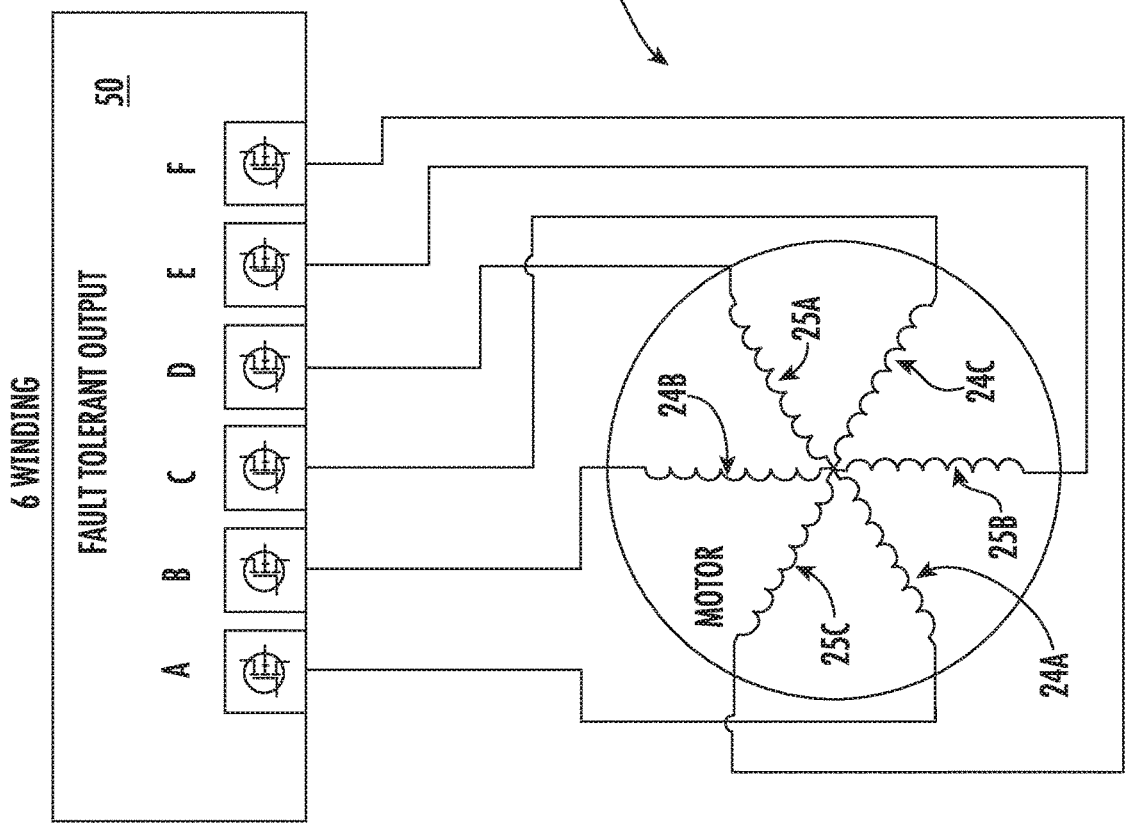
FIG. 2 is an enlarged schematic diagram of a first embodiment of the driver power output shown in FIG. 1.

As illustrated in FIGS. 1 and 2, servo drive 22 includes normal motor controller 26, safety controller 28, and fault tolerant power output 50. Servo drive 22 is in electrical connection with power source 42, ultracapacitor 23, and motor 19. In normal operation, normal controller 26 provides a PWM control signal 61 to fault tolerant power output 50 via safety controller 28, and fault tolerant power output 50 drives motor 19 accordingly.

Fault tolerant power output 50 includes three primary motor phase windings 24A, 24B, 24C and three secondary motor phase windings 25A, 25B, 25C. Sensors 33A, 33B, 33C, 34A, 34B, and 34C are operable to diagnose the state of the primary motor phase windings 24A, 24B, 24C and secondary motor phase windings 25A, 25B, 25C, respectively. In this embodiment, in normal operation, all six of the motor phase windings 24A, 24B, 24C, 25A, 25B, 25C are utilized to operate motor 19 as a six-phase motor. The primary and secondary motor phase windings may be connected via a zigzag 3D winding connection. When one of the sensors 33A, 33B, 33C, 34A, 34B, and 34C detects a motor phase winding 24A, 24B, 24C, 25A, 25B, 25C fault, the operation of the failed motor phase winding is terminated, and motor 19 is operated as a five-phase motor. If more motor phase windings 24A, 24B, 24C, 25A, 25B, 25C fail, motor 19 may also be operated as a four-phase and three-phase motor. Once a motor phase winding 24A, 24B, 24C, 25A, 25B, 25C fails, safety controller 28 operates to provide PWM signal 81 and to drive motor 19 to RSP 46. The connections from output 50 to each of windings 25A, 25B, 25C, 25A, 25B, 25C are permanent and do not need to be switched on. Thus, system 15 is fault tolerant beyond output stage 50 such that an electrical failure in the motor windings 24A, 24B, 24C, 25A, 25B, 25C themselves, not just in output stage 50, still allows motor 19 to be driven to RSP 46.

Figure 3:
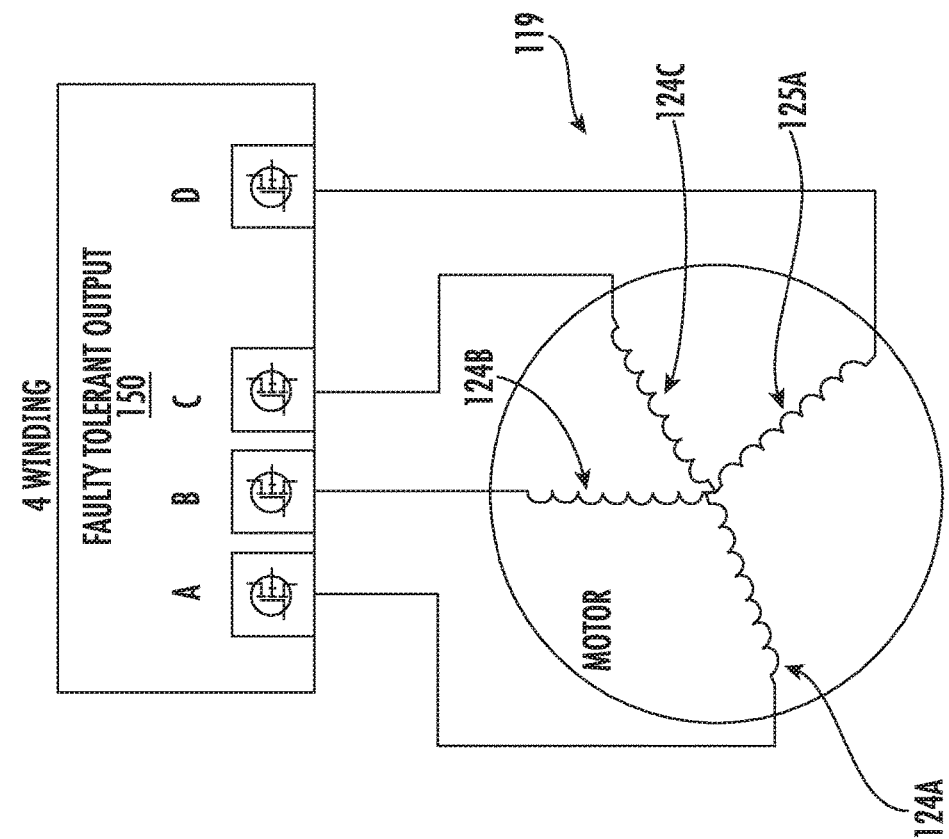
FIG. 3 is an enlarged schematic diagram of a second embodiment of the driver power output shown in FIG. 1.

In a second embodiment shown in FIG. 3, the servo drive includes fault tolerant output stage 150 utilizing three primary motor phase windings 124A, 124B, 124C and at least one secondary motor phase winding 125A. When one of the three primary motor phase windings 124A, 124B, 124C fails, the servo drive safety controller 28 terminates operation of the failed motor phase winding and utilizes the secondary motor phase winding 125A to continue three phase operation of motor 119 to drive motor 119 to RSP. Other combinations or numbers of primary and secondary winding configurations may be employed as alternatives.

A feedback loop is provided between position sensor 43, controllers 26 and 28, drive power stage 50, motor 19 and driven object 40. Under normal operation, controller 26 adjusts the control signal 61 to drive power output 50 in order to make position sensor 43 output match a desired set point. A separate sensor from position sensor 43 may be alternatively used for the feedback loop, such as encoder 35A and resolver 35B connected to motor 19. Command interface 44 provides controller 26 with high level position or movement commands. For example, command interface 44 may command controller 26 to move driven object 40 to a specific position. As the command at interface 44 changes, controller 26 will adjust the desired set point, and in turn change the control signal 61 sent to drive power output 50 via safe controller 28. Controller 28 determines when a power supply failure occurs by comparing power sensor 30 readings to a power threshold. If power sensor 30 output is less than the power threshold, a power failure is determined. In the event of a power failure, power is available in energy storage 23, which can be used to power motor 19. Controller 28 will next intelligently drive motor 19 to safe position 46. Controller 28 compares position sensor 43 output with safe position 46 and determines if object 40 position is within safe position 46.

Figure 6:
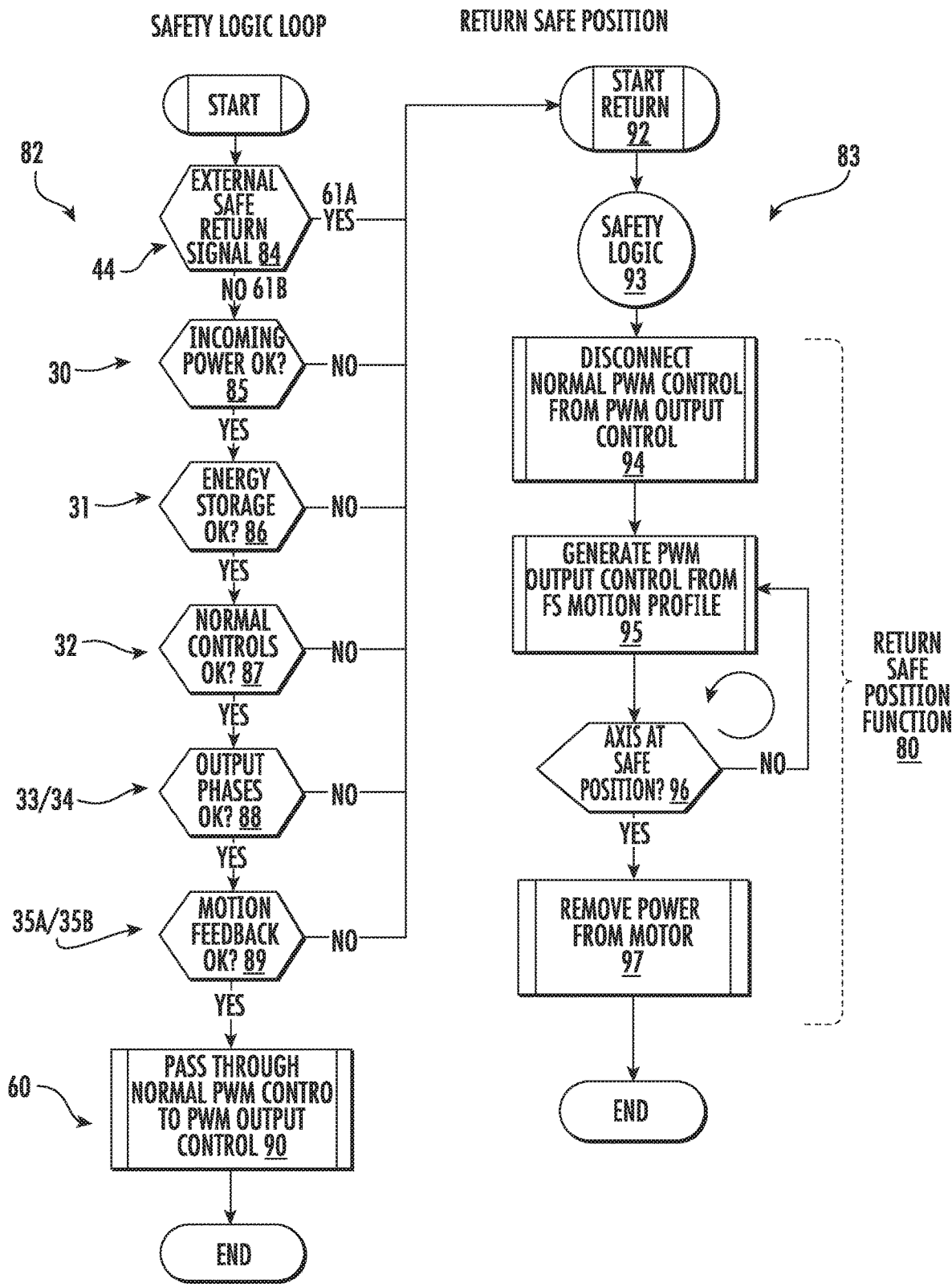
FIG. 6 is a flow diagram of the safety logic and run safe position shown in FIG. 1.

As shown in FIG. 6, safety controller 28 includes safety logic 82, which receives inputs from external signal interface 44 and sensors 30, 31, 32, 34, 35A and 35B. Based on whether such inputs indicate a fault, motor 19 is driven by normal motor controller 26 or safety controller 28. Loop 82 first determines 84 whether a signal has been received from external signal interface 44 indicating that motor 19 should be driven to safe return position 46. If safe signal 61A is received, return safe position routine 83 is initiated. If signal 61B is provided, safety control 28 then determines 85 whether incoming power 42 is at the appropriate threshold based on sensor reading 30. If no, return safe position routine 83 is initiated. If yes, safety controller 28 determines 86 whether battery 23 is operating and charged at the appropriate threshold via battery sensor 31. If no, return safe position routine 83 is initiated. If yes, safety controller 28 determines 87 whether normal motor control 26 is operating properly via sensor 32. If no, return safe position routine 83 is initiated. If yes, safety controller 28 determines 88 whether each of output phase windings 24A, 24B, 24C, 25A, 25B and 25C are operational and without electrical fault via sensors 33A, 33B, 33C, 34A, 34B and 34C, respectively. If a fault is detected, return safe position routine 83 is initiated. If a fault is not detected, controller 28 determines 89 whether motion feedback of motor 19 is functional at the desired accuracy and threshold via encoder 35A and resolver 35B. If no, return safe position routine 83 is initiated. If yes, normal motor controller 26 operates fault tolerant output switch 50 to drive motor 19 with PWM control signal 61 passing through 90 safety controller 28 to actuate object 40 in the ordinary course. This loop is repeated periodically.

Figure 7:
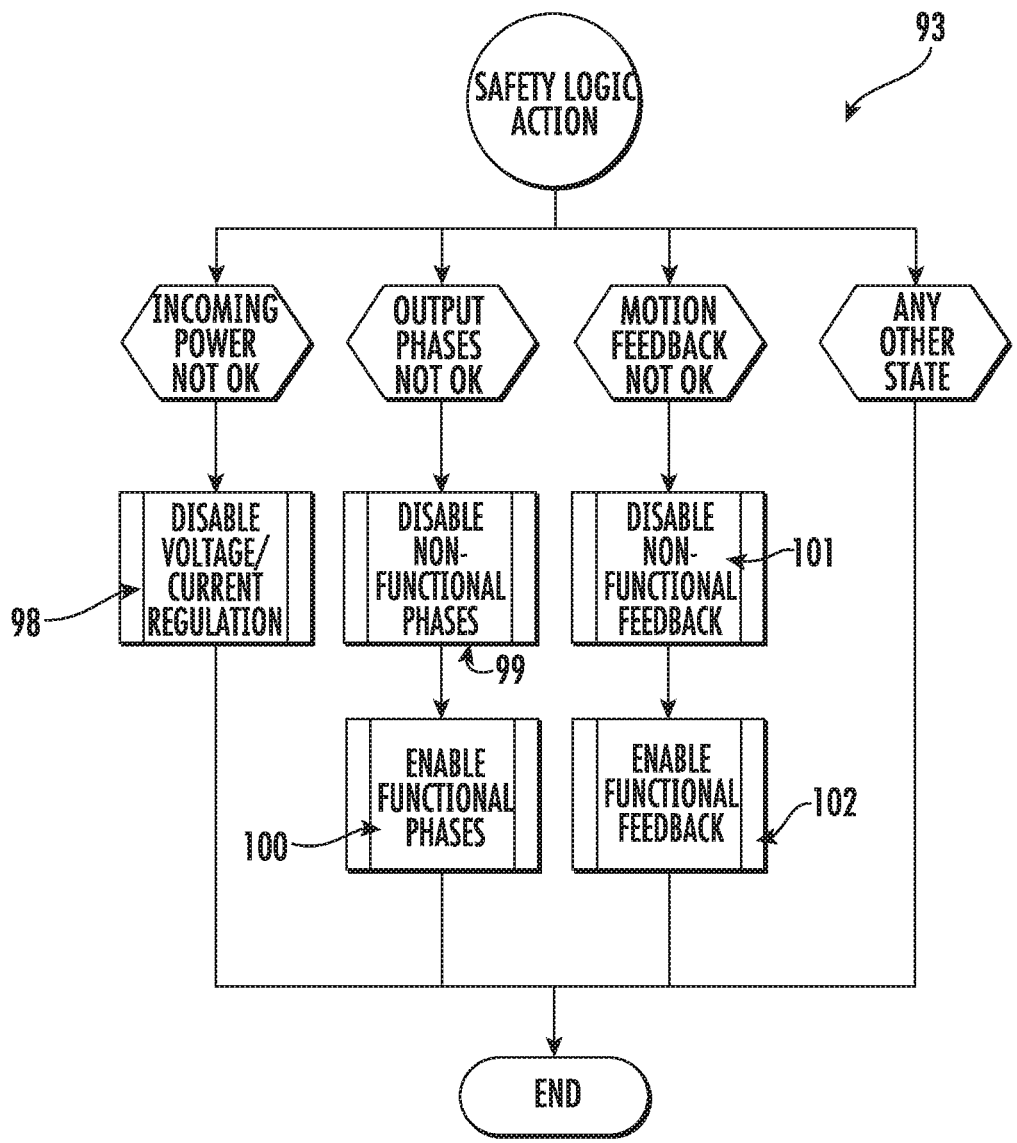
FIG. 7 is a flow diagram of the safety logic action shown in FIG. 6.

In the event that return safe position routine 83 is initiated by safety controller 28, then safety controller 28 provides return safe position function 83 as shown in FIGS. 6 and 7. The first step in return safe function 83 is identifying 93 the fault detected. As shown in FIG. 7, if the fault detected is with respect to incoming power 85, then safety controller 28 disables 91 voltage and current regulator 49 and relies on energy storage 23 to drive motor 19 to safe position 46. As shown, if the fault detected is in a winding phase, then safety controller 28 disables 99 such non-functioning winding phase and enables 100 the functioning winding phases to drive motor 19 to safe position 46. If the fault detected is in motion feedback, then safety controller 28 disables 101 the non-functioning feedback and enables 102 the functioning feedback, such as a sensorless feedback, to drive motor 19 to safe position 46. Similarly, if energy storage battery 23 has a detected fault or if normal motor controller 26 has a detected fault, then safety controller 28 drives motor 19 to safe position 46.

With reference to FIG. 6, once the detected safety logic is determined as shown in FIG. 7, safety controller 28 disconnects 94 normal PWM control signal 61 from normal motor controller 26 to fault tolerant power output 50. Safety controller 28 then generates 95 its own PWM output control signal 81 as a function safety logic routine 93 from the identified faults to drive motor 19 to safe position 46 within range of motion 45. Based on position sensor 43, which may be augmented by motor position sensors 35A and 35B, depending on safety logic routine 93, safety controller 28 determines 96 whether object 40 and rotor 21 are in safe position 46. Safety controller 28 drives motor 19 until it is determined that rotor 21 and object 40 are in safe position 46. Once rotor 21 and object 40 are in safe position 46, safety controller 28 removes and disconnects 97 power from fault tolerant power output 50 and motor 19.

Figure 8:
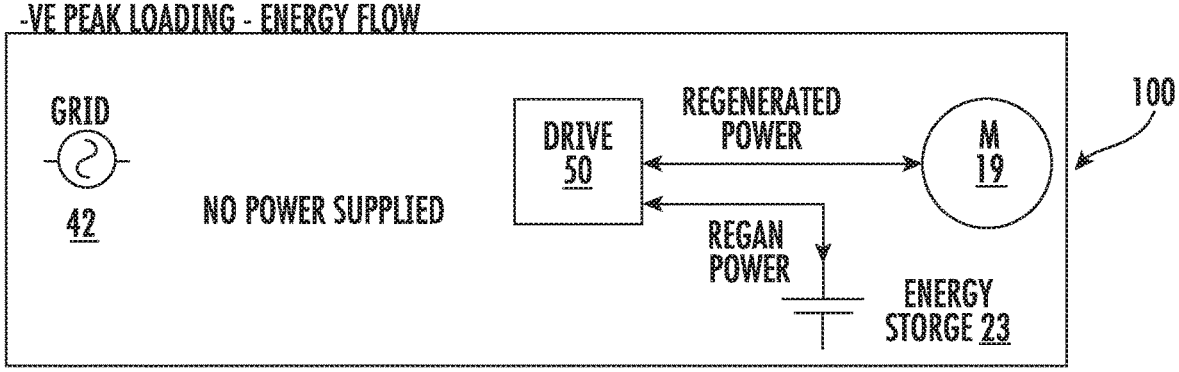
FIG. 8 is a schematic diagram of power distribution mode embodiments of the electric motor assembly shown in FIG. 1.
Figure 8:
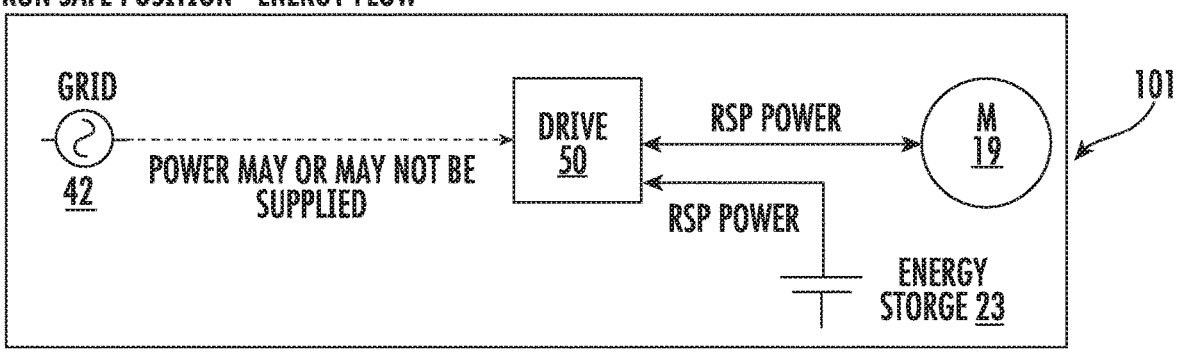
Figure 8:
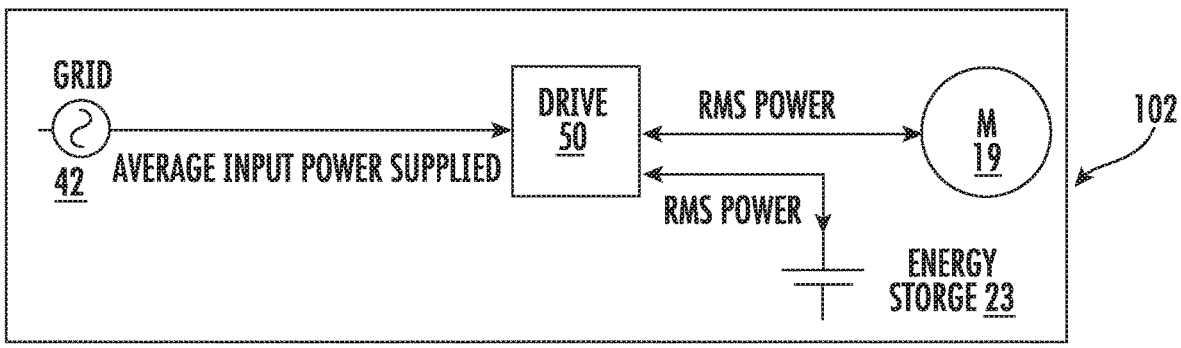
Figure 8:
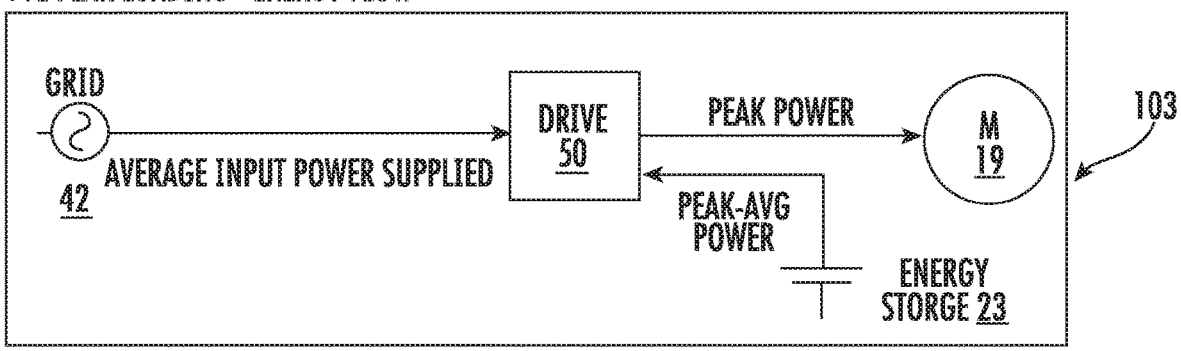

It is also contemplated that system 15 may be used in different power modes under certain circumstances, as shown is FIG. 8. In regeneration mode 100, controller 26 may be configured to provide a regenerative signal which causes the terminals of power drive 50 to be connected in such a way that energy is absorbed from electric motor 19 and stored in energy storage 23. Thus, energy is transferred from electric motor 19 and object 40 to energy storage 23 by allowing current to be driven by motor 19 back into energy storage 23 through DC bus 48. In run-safe mode 101, run-safe power is provided to power drive 50 from at least energy storage 23 to motor 19. Depending on the fault detected, power from primary power source 42 may or may not be supplied. In normal operation mode 102, power from primary power source 42 is supplied via DC bus to power drive 50 and used to power motor 19 and/or to recharge energy storage 23. In peak loading mode 103, average input power is supplied by primary power source 42 and peak average power is supplied by internal energy storage 23 to drive motor 19 at its peak power requirements. Thus, energy storage 23 may be used to augment and provide peak loading energy to incoming power supply 42.

Figure 9:
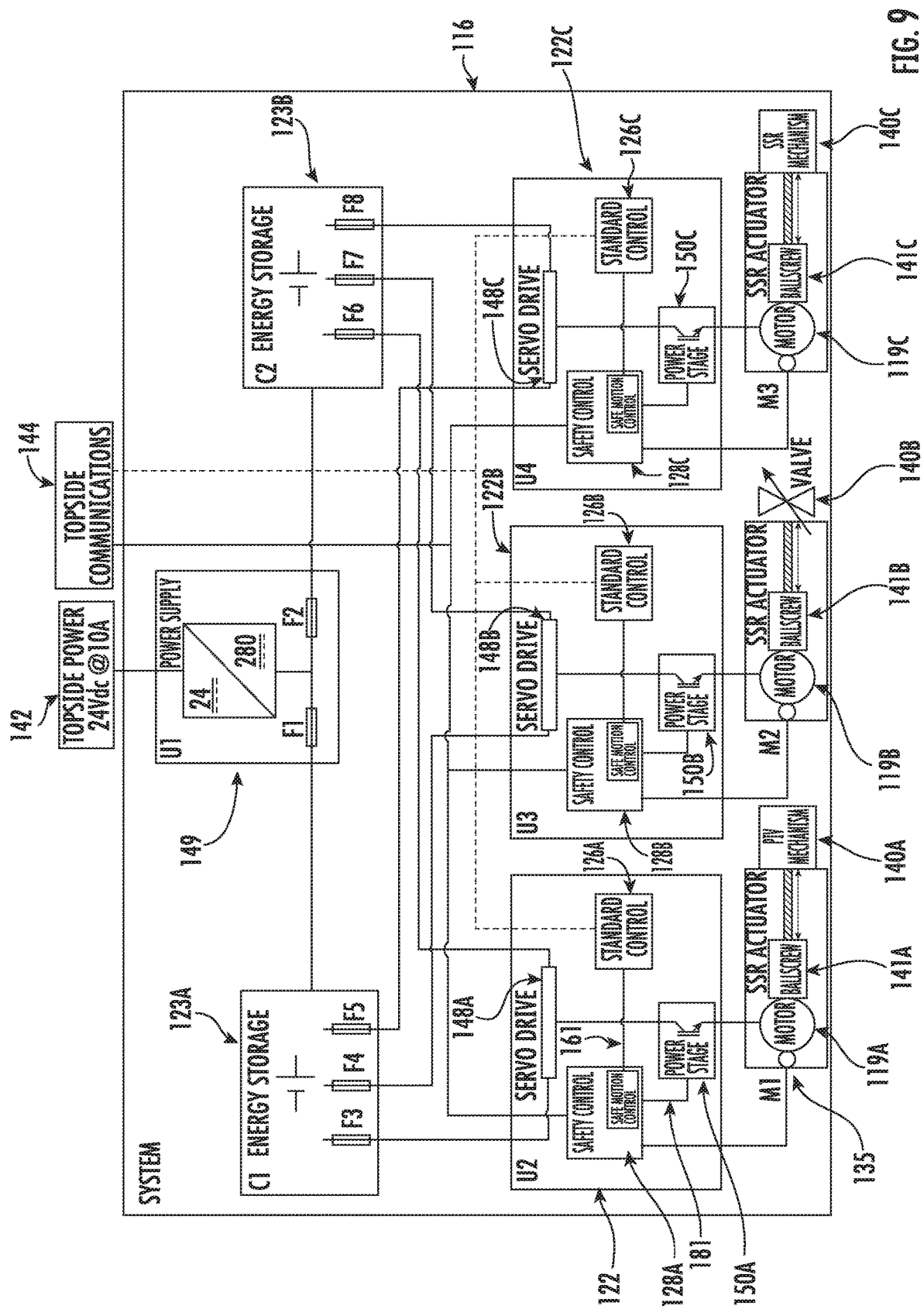
FIG. 9 is a schematic diagram of an embodiment of the electric motor assembly shown in FIG. 1 in a subsea electromechanical actuator application.

FIG. 9 is a schematic diagram of an embodiment of the electric motor assembly shown in FIG. 1 in an electromechanical actuator (EMA) application for a subsea well. As shown, three permanent magnet synchronous motors 119A, 119B and 119C are provided having the configuration of motor 19 and configured to drive ballscrews 141A, 141B and 141C to linearly actuate position indicator valve 140A, flow control valve 140B and shear seal ram 140C, respectively. Topside primary power 142 is provided to converter 149 and to DC buses 148A, 148B and 148C for each of motors 119A, 119B and 119C. Power is also provided to energy storage 123A and energy storage 123B. Motors 119A, 119B and 119C are driven by servo drives 122A, 122B and 122C, respectively, having standard controllers 126A, 126B and 126C, safety controllers 128A, 128B and 128C, and power stages 150A, 150B and 150C, respectively. Servo drives 122A, 122B and 122C generally have the same configuration and functionality as servo-drive 22 of FIG. 1. Standard controllers 126A, 126B and 126C generally having the same configuration and functionality as normal controller 26 of FIG. 1. Safety controllers 128A, 128B and 128C generally having the same configuration and functionality as safety controller 28 of FIG. 1 and receive commands from topside communications 144. Power stages 150A, 150B and 150C generally having the same configuration and functionality as drive power output stage 50 of FIG. 1. Thus, each motor 119A, 119B and 119C is driven by a respective servo drive 122A, 122B and 122C powered from ultracapacitor storage modules 123A and 123B that are in turned charged from topside power 142 through converter 149. The stored energy in ultracapacitor modules 123A and 123B is enough to carry out the actuators complete cycle and RSP if required. When required, the subject actuator may be driven to a full extended safe position.

Figure 10:
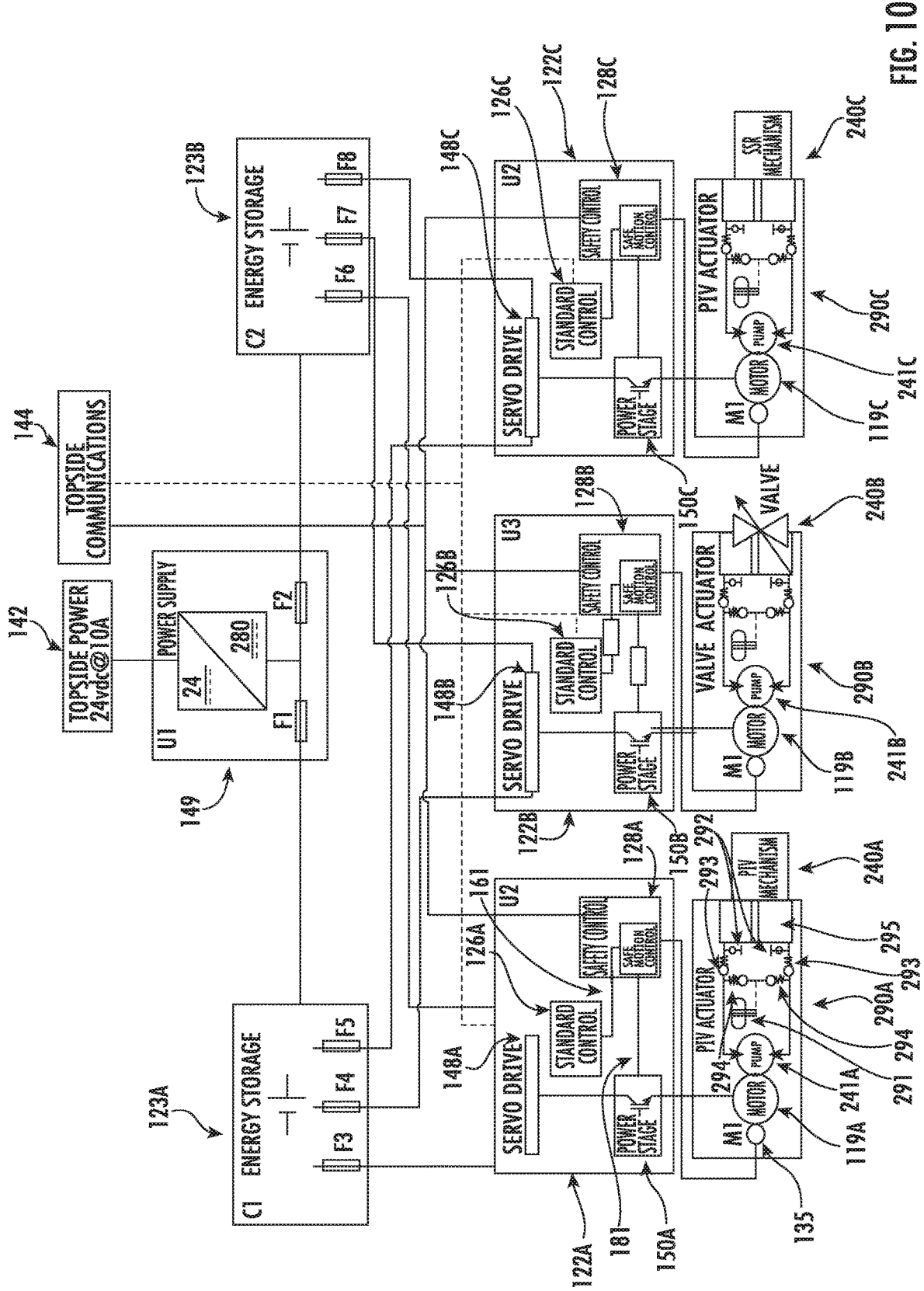
FIG. 10 is a schematic diagram of an embodiment of the electric motor assembly shown in FIG. 1 in a subsea electrohydraulic actuator application.

FIG. 10 is a schematic diagram of an embodiment of the electric motor assembly shown in FIG. 1 in an electrohydraulic actuator (EHA) application for a subsea well. As shown, three permanent magnet synchronous motors 119A, 119B and 119C are provided having the configuration of motor 19 and configured to drive pumps 241A, 241B and 241C to actuate position indicator valve 240A, flow control valve 240B and shear seal ram 240C via hydraulic units 290A, 290B and 290C, respectively. Topside primary power 142 is provided to converter 149 and to DC buses 148A, 148B and 148C for each of motors 119A, 119B and 119C. Power is also provided to energy storage 123A and energy storage 123B. Motors 119A, 119B and 119C are driven by servo drives 122A, 122B and 122C, respectively, having standard controllers 126A, 126B and 126C, safety controllers 128A, 128B and 128C, and power stages 150A, 150B and 150C, respectively. Servo drives 122A, 122B and 122C generally have the same configuration and functionality as servo-drive 22 of FIG. 1. Standard controllers 126A, 126B and 126C generally having the same configuration and functionality as normal controller 26 of FIG. 1. Safety controllers 128A, 128B and 128C generally having the same configuration and functionality as safety controller 28 of FIG. 1 and receive commands from topside communications 144. Power stages 150A, 150B and 150C generally having the same configuration and functionality as drive power output stage 50 of FIG. 1. Thus, each motor 119A, 119B and 119C is driven by a respective servo drive 122A, 122B and 122C powered from ultracapacitor storage modules 123A and 123B that are in turned charged from topside power 142 through converter 149. The stored energy in ultracapacitor modules 123A and 123B is enough to carry out the actuators complete cycle and RSP if required. When required, the subject actuator may be driven to a full extended safe position.

Hydraulic units 290A, 290B and 290C are each a closed loop hydraulic circuit which is driven by positive displacement pump 241 to extend and retract hydraulic cylinder driving mechanism 295. In this embodiment, servo-motor 119 is used to drive reversible pump 241 to extend and retract cylinder 295, which in turn drives each respective mechanism 240A, 240B, and 240C. Pump 241 pressurizes a working fluid, typically hydraulic oil, directly raising the pressure in a hydraulic gap on one side or the other of hydraulic cylinder 295. Reservoir 291 compensates and accommodates for volume change due to cylinder or piston 295 cross section variations. Quick connect valves 292 allow for hot stab quick connect function. Pilot-operated check valves 293 lock hydraulic cylinder 240 in place and also allow isolation between quick connect valves 292 and cylinder 295 and the pump part of the circuit. If there is a failure in the hydraulic system, a remote operation vehicle (ROV) can descend from the topside down to the actuator and hot stab the actuator and operate the actuator from the ROV's on-board hydraulic power unit. Check valves 294 compensate fluid due to the area differences on cylinder 240. If the large area of cylinder 295 is flowing to pump 241, the increased pilot pressure on the opposite side of pump 241 will open check valve 294 and allow any volume over the required pump volume to flow to reservoir 291. On the other hand, if the small area of cylinder 295 is flowing to pump 241, the increased pilot pressure on the opposite side of pump 241 will open check valve 294 and allow additional volume to be drawn in from reservoir 291 to satisfy the required pump flow. Motor 119 and pump 241 are controlled to drive the subject actuator to the desired position. Thus, instead of energy needed to move the controls being supplied by an external hydraulic supply, it is supplied over normal electrical wiring. The system draws power when it is being moved, but pressure is maintained internally when the motor stops.

Electric motor system 15 provides a number of advantages. For example, the system will RSP with a highly degree of reliability and can move to a safe position with a performance level that meets or exceeds PLe as defined in ISO 13849. The system can be safety certified to safety integrity level SIL2 or have a probability of a dangerous failure of less than $10^{-6}$ per hour and a hardware fault tolerance (HFT) of at least one based on ISO 13849 and IEC 61508 (IEC 61508 is the international standard for electrical, electronic and programmable electronic safety related systems which sets out the requirements for ensuring that systems are designed, implemented, operated and maintained to provide a required safety integrity level (SIL)). The system is fault tolerant such that a single element failure does not prevent the RSP function from working. There must be at least two independent failures to stop the RSP function from working. This includes a fault tolerant drive output power stage. The drive can detect a single phase winding failure and still be able to drive the other winding phases. The DC bus management can control voltage and current, and Common Cause Failures (CCFs) are mitigated to a low enough probability such that RSP can be achieved. The system does not need a mechanical spring return to drive to the safe position. The system is compact and able to be used in downhole space-constrained environments, for example. The system can integrally manage peak power to minimize incoming grid power requirements. The local energy storage device can supply peak power and can store regenerative (negative peak) power for reuse during peak conditions or upon a detected fault. The system is modular and has controllers in the same housing as the motor such that the unit may be placed physically near to the operating actuator. The controllers provide safe communications (FSoE), safe I/O and safe motion function to ensure actuation movement to a safe position, such as a closed position. The motor may also be operated using sensorless control, avoiding the need for motor position feedback to drive the motor. Multiple output drive stages are provided so a failure in one output stage does not prevent the motor from being driven.

The present disclosure contemplates that many changes and modifications may be made. Therefore, while forms of the improved electric motor assembly have been shown and described, and a number of alternatives discussed, persons skilled in this art will readily appreciate that various additional changes and modifications may be made without departing from the scope of the invention, as defined and differentiated by the following claims.

What is claimed is:

1. An electric motor assembly comprising:
   a housing having an interior volume;
   said housing containing in said interior volume an electric motor, a motor driver and a secondary power source;
   said electric motor comprising a stator and a mover mounted for movement relative to one another;
   said electric motor operatively configured to connect to a primary power supply;
   said mover of said electric motor operatively configured to mechanically couple to an object external to said interior volume of said housing to be driven by said electric motor within a range of motion and having a safe position within said range of motion;
   said electric motor connected to said secondary power source;
   said stator comprising a primary winding operatively configured to move said mover in a normal operation mode;
   said stator comprising a secondary winding operatively configured to move said mover in a secondary operation mode;
   said motor driver comprising a primary motor controller operatively configured to control said primary winding in said normal operation mode;
   said motor driver comprising a secondary motor controller operatively configured to control at least one of said primary winding and/or said secondary winding in said secondary operation mode;
   a power sensor configured to sense a fault in said primary power supply and communicating with said secondary motor controller;
   a power sensor configured to sense a fault in said secondary power source and communicating with said secondary motor controller;
   a primary winding sensor configured to sense a fault in said primary winding and communicating with said secondary motor controller;
   a secondary winding sensor configured to sense a fault in said secondary winding and communicating with said secondary motor controller;
   said secondary motor controller configured to drive said motor to said safe position using said secondary winding in the event of a sensed fault in said primary winding; and
   said secondary motor controller configured to drive said motor to said safe position using said secondary power source in the event of a sensed fault in said primary power source.

2. The electric motor assembly set forth in claim 1, comprising a primary motor controller sensor configured to sense a fault in said primary motor controller and communicating with said secondary motor controller, and wherein said secondary motor controller is configured to drive said motor to said safe position in the event of a sensed fault in said primary motor controller.

3. The electric motor assembly set forth in claim 1, wherein said secondary motor controller is configured to drive said motor to said safe position in the event of a sensed fault in said secondary power source.

4. The electric motor assembly set forth in claim 1, wherein said motor comprises a three-phase interior or surface mount permanent magnet synchronous motor.

5. The electric motor assembly set forth in claim 1, wherein said mover comprises a permanent magnet and said primary winding comprises three phases.

6. The electric motor assembly set forth in claim 5, wherein said secondary winding comprises a single phase.

7. The electric motor assembly set forth in claim 5, wherein said secondary winding comprises three phases.

8. The electric motor assembly set forth in claim 1, comprising a mover position sensor configured to sense a fault in said electric motor and communicating with said secondary motor controller, and wherein said secondary motor controller is configured to drive said motor to said safe position in the event of a sensed fault in said electric motor.

9. The electric motor assembly set forth in claim 1, wherein said secondary motor controller is configured to operate a common DC bus such that energy from said primary power supply is used to charge said secondary power source when said secondary power source is not fully charged.

10. The electric motor assembly set forth in claim 1, wherein said secondary power source comprises a capacitor or a battery.

11. The electric motor assembly set forth in claim 1, wherein said object comprises a valve or a pump.

12. The electric motor system set forth in claim 1, wherein said mover position sensor comprises an encoder, a resolver or a LVDT.

13. The electric motor system set forth in claim 1, wherein said power sensor comprises a voltage sensor.

14. The electric motor system set forth in claim 1, wherein said primary power supply comprises a three phase AC power supply.

* * * * *